UNITED STATES PATENT OFFICE.

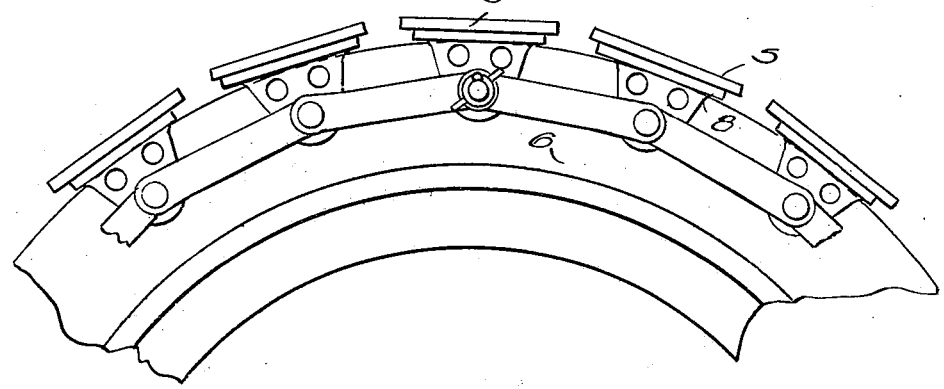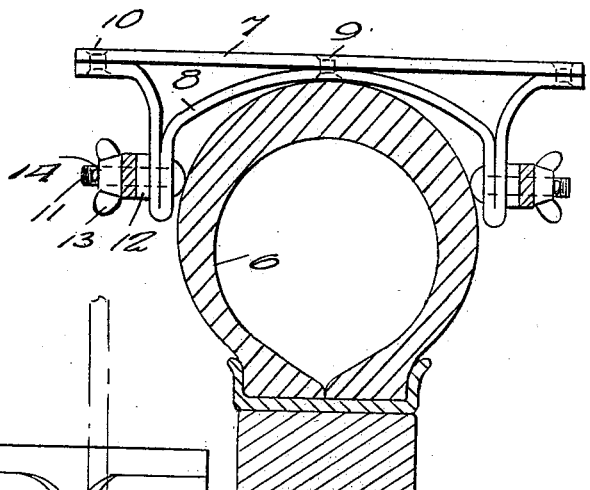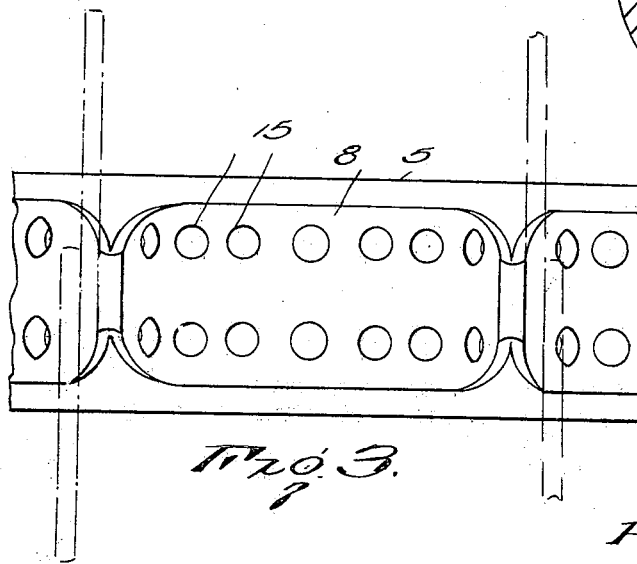

PAUL E. GERO, OF MANISTIQUE, MICHIGAN.

DETACHABLE TRACTION-TREAD.

1,375,584.  Specification of Letters Patent.  Patented Apr. 19, 1921.

Application filed March 28, 1919. Serial No. 285,810.

*To all whom it may concern:*

Be it known that I, PAUL E. GERO, a citizen of the United States, residing at Manistique, in the county of Schoolcraft and State of Michigan, have invented certain new and useful Improvements in Detachable Traction-Treads, of which the following is a specification.

This invention relates to improvements in detachable traction treads of the type described and claimed in my co-pending application for patent Serial No. 268,463, filed December 27, 1918.

The object of the present invention is to provide a detachable tread for vehicle tires consisting of an annular series of traction plates provided with an improved type of retaining member for partly embracing the tread portion of the tire and having connection with a series of side links whereby the several members are supported in operative position upon the tire.

With this and other objects in view as will appear as the description proceeds the invention comprises the novel features of construction, combination of elements and arrangement of parts which will be more fully described in the following specification and set forth with particularity in the claim appended hereto.

Figure 1 represents a fragmental side elevaton of a vehicle wheel illustrating the improved traction tread applied thereto, Fig. 2 represents a transverse sectional view through the wheel rim and tire illustrating the structure 1 of the tread plate furrow in detail, and Fig. 3 represents a plan view of the interior of the tread element.

Referring to the drawing in detail, wherein similar reference characters occur designating corresponding parts throughout the several views, 5 indicates a series of tread elements arranged about a vehicle tire 6 and each consisting of a substantially flat body or tread plate 7 constructed of metal or other suitable material disposed transversely across the tread portion of the tire. Each tread element further consists of a substantially U-shaped tire embracing member 8 the web portion of which is riveted or otherwise secured to the medial portion of the tread plate 7 and the parallel ends thereof are spaced an adequate distance apart to accommodate the tire 6. The material of the embracing member 8 is bent back at the terminals of the U-shaped member to increase the thickness of the material at the terminals of the latter and the turned back portions are curved outwardly in contact with the inner surface of the tread plate 7 and are secured thereto as indicated at 10 to strengthen and reinforce the retaining member and to maintain the latter in position upon the tread plate.

The double portions of the terminals of the U-shaped retaining members 8 are provided with apertures to receive rivets 11$^a$ which are arranged upon opposite sides of the tire 6 and pivotally support the adjacent terminals of the substantially circular series of links 12 by which the traction elements are connected and maintained in uniformly spaced relation about the tire. The adjacent terminals of the end links are connected by bolts 11, as shown in Fig. 2 and are secured in position by removable wing nuts 13 fitted upon the bolts 11 and secured against accidental removal by cotter pins 14. The U-shaped tire engaging member 8 of each tread element is formed with a series of perforations 15 designed to reduce the weight thereof without appreciably detracting from the strength and rigidity of the element.

What I claim is:

A detachable traction tread for vehicle tires comprising a tread plate adapted to span a tire tread and having an inverted U-shaped tire embracing retaining member secured to the inner face of said plate, the legs of said member being adapted to straddle and extend down over the sides of the tire, said legs being folded back upon themselves with their terminals curved outwardly and secured to said tread plate, and means extended through the folded portion of said legs for attaching the tread to a tire.

In testimony whereof, I affix my signature hereto.

PAUL E. GERO.